United States Patent [19]

Kauer

[11] Patent Number: 4,830,812

[45] Date of Patent: May 16, 1989

[54] METHOD AND SYSTEM FOR MAKING A HOLLOW-SHAPED BODY FROM MOLTEN RESIN BY INJECTION MOLDING

[75] Inventor: Hubert Kauer, Warren, Mich.

[73] Assignee: Michael Ladney, Grosse Pointe Shores, Mich.

[21] Appl. No.: 182,144

[22] Filed: Apr. 15, 1988

[51] Int. Cl.$^4$ .................. B29C 45/63; B29D 22/00
[52] U.S. Cl. .................. 264/572; 264/161; 425/812
[58] Field of Search .............. 264/572, 526, 161, 154; 425/812

[56] References Cited

U.S. PATENT DOCUMENTS

| | | | |
|---|---|---|---|
| 2,331,688 | 10/1943 | Hobson | 18/5 |
| 2,345,144 | 3/1944 | Opavsky | 18/47.5 |
| 2,714,747 | 8/1955 | Lindemann et al. | 18/48 |
| 2,714,748 | 8/1955 | Stirnemann et al. | 18/48 |
| 3,021,559 | 2/1962 | Strong | 18/5 |
| 3,135,640 | 6/1964 | Kepka et al. | 156/147 |
| 3,369,690 | 2/1968 | Hayes | 264/161 |
| 3,443,001 | 5/1969 | Adair et al. | 264/161 |
| 3,687,582 | 8/1972 | Hendry et al. | 425/4 |
| 3,793,422 | 2/1974 | Johnston | 264/161 |
| 3,966,372 | 6/1976 | Yasuike et al. | 425/4 R |
| 4,033,710 | 7/1977 | Hanning | 425/543 |
| 4,078,875 | 3/1978 | Eckardt | 425/217 |
| 4,082,226 | 4/1978 | Appleman et al. | 239/584 |
| 4,092,389 | 5/1978 | Sakurai | 264/89 |
| 4,101,617 | 7/1978 | Friederich | 264/93 |
| 4,106,887 | 8/1978 | Yasuike et al. | 425/549 |
| 4,108,956 | 8/1978 | Lee | 264/329 |
| 4,129,635 | 12/1978 | Yasuike et al. | 264/45.5 |
| 4,136,220 | 1/1979 | Olabisi | 428/35 |
| 4,140,672 | 2/1979 | Kabaoka | 264/45.1 |
| 4,234,642 | 11/1980 | Olabisi | 428/188 |
| 4,247,515 | 1/1981 | Olabisi | 264/500 |
| 4,333,608 | 6/1982 | Hendry | 239/118 |
| 4,357,296 | 11/1982 | Hafele | 264/532 |
| 4,474,717 | 10/1984 | Hendry | 264/45.5 |
| 4,555,225 | 11/1985 | Hendry | 425/4 R |
| 4,601,870 | 7/1986 | Sasaki | 264/572 |
| 4,604,044 | 8/1986 | Hafele | 425/525 |
| 4,740,150 | 4/1988 | Sayer | 425/542 |

FOREIGN PATENT DOCUMENTS

| | | |
|---|---|---|
| 2106546 | 8/1972 | Fed. Rep. of Germany . |
| 120318 | 6/1975 | Japan . |
| 1460101 | 12/1976 | United Kingdom . |
| 1487187 | 9/1977 | United Kingdom . |
| 2139548 | 11/1984 | United Kingdom . |

Primary Examiner—Jan H. Silbaush
Assistant Examiner—Neil Michael McCarthy
Attorney, Agent, or Firm—Brooks & Kushman

[57] ABSTRACT

Method and system are disclosed for making a hollow-shaped body from molten resin wherein the method includes the step of cutting a hole through the resin after it is cooled and into a fluid aperture formed during a fluid injection step which distributes the molten resin over the interior surfaces of a mold of the system. The fluid aperture is in communication with the interior of the resulting hollow-shaped body and is preferably located in the runner or sprue of the mold. The fluid is preferably a gas, such as nitrogen. In each of the disclosed embodiments of the invention, a cutting member is located in the mold and has a surface which at least partially defines a resin flow path in the mold. Cutting is accomplished by moving the cutting member in a controlled fashion between a molding position and a relieving position so that the cutting member applies a cutting force to cut the hole. The cutting member includes a fluid-relieving aperture formed therein. The fluid-relieving aperture is in fluid communication with the fluid aperture in the relieving position of the cutting member to relieve the pressure through the fluid-relieving aperture. In some of the disclosed embodiments, the cutting force is a sheer force which is applied tangential to the cooled resin. In another disclosed embodiment, the cutting force is applied substantially perpendicular to the cooled resin. The cutting member is movable linearly in one embodiment and is movable in a rotary fashion in another emodiment.

4 Claims, 4 Drawing Sheets

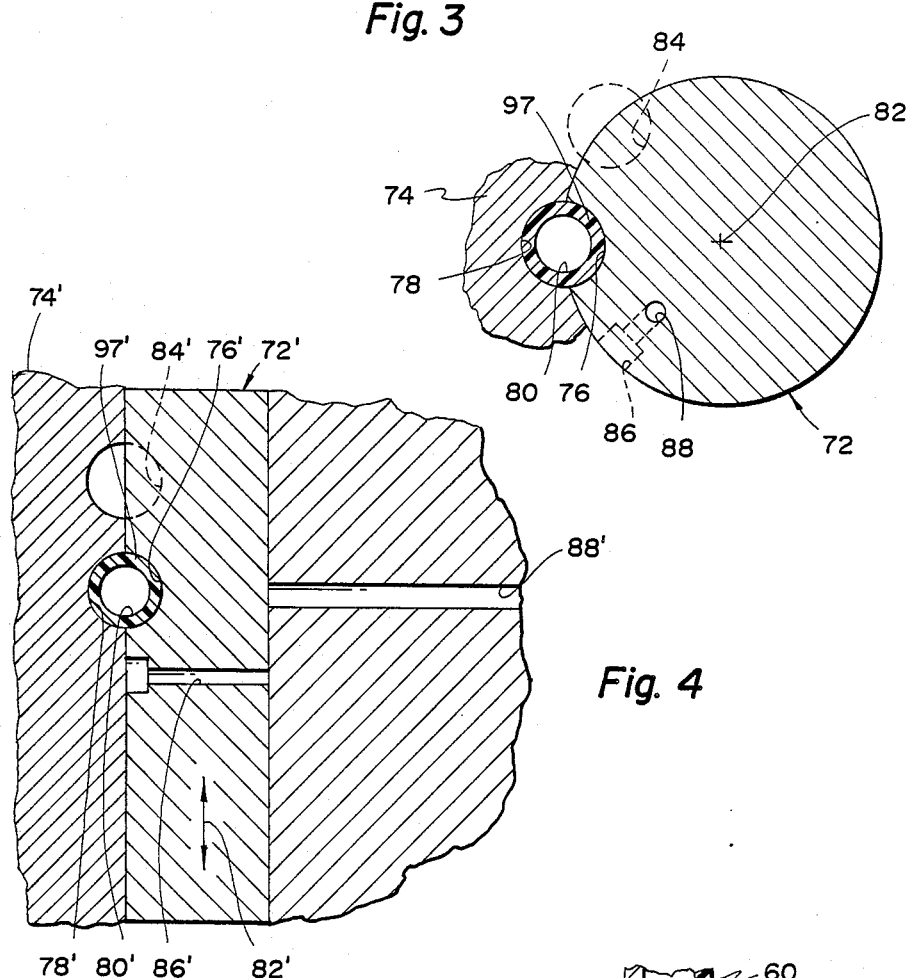
Fig. 3
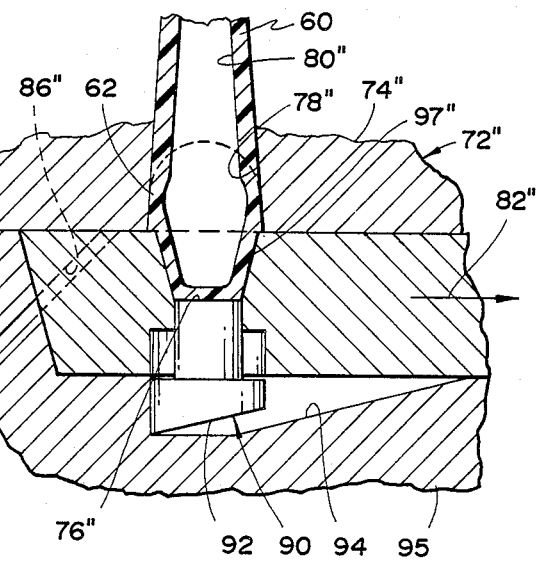
Fig. 4
Fig. 5

METHOD AND SYSTEM FOR MAKING A HOLLOW-SHAPED BODY FROM MOLTEN RESIN BY INJECTION MOLDING

TECHNICAL FIELD

This invention relates to method and system for making a hollow-shaped body from molten resin by injection molding and, in particular, to method and system for making a hollow-shaped body from molten resin by injection molding wherein pressure is relieved within the hollow-shaped body before a mold of the system is opened.

BACKGROUND ART

It is well known in the plastic molding art to use pressurized fluid in conjunction with the injection molding of articles. The pressurized fluid is typically nitrogen gas which is introduced into the molten resin.

Pressurized fluid serves many purposes. First, it allows the article so formed to have hollow interior portions which result in weight and material savings. Secondly, it minimizes the molded in stresses by eliminating high second stage injection pressure. This also reduces part weight in that the gas is used to fill out the part. Thirdly, the pressurized fluid applies outward pressure to force the plastic against the surfaces of the mold cavity while the article is setting up. This enhances surface quality by eliminating sink marks, especially in areas of the article having thicker plastic sections, such as structural ribs or bosses.

Presently, there are two primary methods employed to relieve the internal pressure in a hollow-shaped body while still located in its respective mold. One method is to relieve the gas through the gas-injection supply through the use of valving. One problem with this approach is that the orifice becomes clogged with resin or other contaminants rendering the orifice non-functional and thereby disrupting normal production.

The second method is commonly called sprue break. This method is performed by disengaging the injection nozzle from the sprue bushing of the mold, thereby exposing the gas channel in the sprue to the atmosphere.

The Friederich U.S. Pat. No. 4,101,617 discloses a method for injection molding of hollow-shaped bodies wherein the pressure is relieved directly into the part. The Friederich patent discloses a sprue break as well as opening the interior of the hollow body to relieve the internal pressure.

The Hendry U.S. Pat. No. 4,474,717 discloses a fluid-assisted injection molding method and system including a probe having a head with one or more fluid orifices. In one embodiment the probe is retractable. Pressure within the hollow-shaped body is relieved through the probe.

The U.K. Patent Application No. 2,139,548 discloses an injection molding process wherein pressurized fluid is injected into a stream of plastic material at one or more selected positions in the mold space through a passageway which projects into the path of the molten resin. Pressure within the resulting hollow-shaped body is relieved through the passageway.

DISCLOSURE OF THE INVENTION

An object of the present invention is to provide an improved method and system for making hollow-shaped bodies from molten resin by injection molding, wherein pressure is relieved within the hollow-shaped body by cutting a hole through the cooled resin and into a fluid aperture formed during the method.

In carrying out the above objects and other objects of the present invention, a method for making a hollow-shaped body from a molten resin in an injection molding system is provided. The system includes a mold having an injection aperture and an injection nozzle. The method includes the steps of injecting an amount of molten resin sufficient for the preparation of the hollow-shaped body from the injection nozzle through the injection aperture and along the resin flow path in the mold. Then a fluid is injected into the mold under pressure to distribute the molten resin over the interior surfaces of the mold wherein a fluid aperture in communication with the interior of the hollow-shaped body is formed. The hollow-shaped body is then cooled to a temperature beneath the softening point of the resin and the pressure within the hollow-shaped body is relieved. The pressure is relieved by cutting a hole through the cooled resin into the fluid aperture. Finally, the mold is opened to remove the hollow-shaped body.

The injection molding system constructed in accordance with the present invention further inclues a fluid injection mechanism for injecting the fluid and a cutting mechanism which cuts a hole through the cooled resin in communication with the fluid aperture.

Preferably, the cutting mechanism includes a cutting member mounted for movement in a controlled fashion between a molding position and a relieving position within the mold. The cutting member has a surface which at least partially defines the resin flow path.

Also, preferably, the cutting mechanism includes a fluid-relieving aperture formed therein which is in communication with the fluid aperture in the relieving position of the cutting member, so that the pressure is relieved through the fluid-relieving aperture in a controlled fashion in the relieving position of the cutting member.

The advantages accruing to the method and system of the invention are numerous. For example, decompression is controlled to thereby eliminate moldings having stress cracks, warpage and unsightly surfaces.

The objects, features and advantages of the present invention are readily apparent from the following detailed description of the best modes for carrying out the invention when taken in connection with the accompanying drawings.

BRIEF DESCRIPTION OF THE DRAWINGS

FIG. 3 is an end view, partially broken away and in cross-section, illustrating a first embodiment of the present invention;

FIG. 4 is a view, partially broken away and in cross-section, illustrating a second embodiment of the present invention;

FIG. 5 is a view, partially broken away and in cross-section, illustrating a third embodiment of the present invention;

BEST MODES FOR CARRYING OUT THE INVENTION

Figure 1:
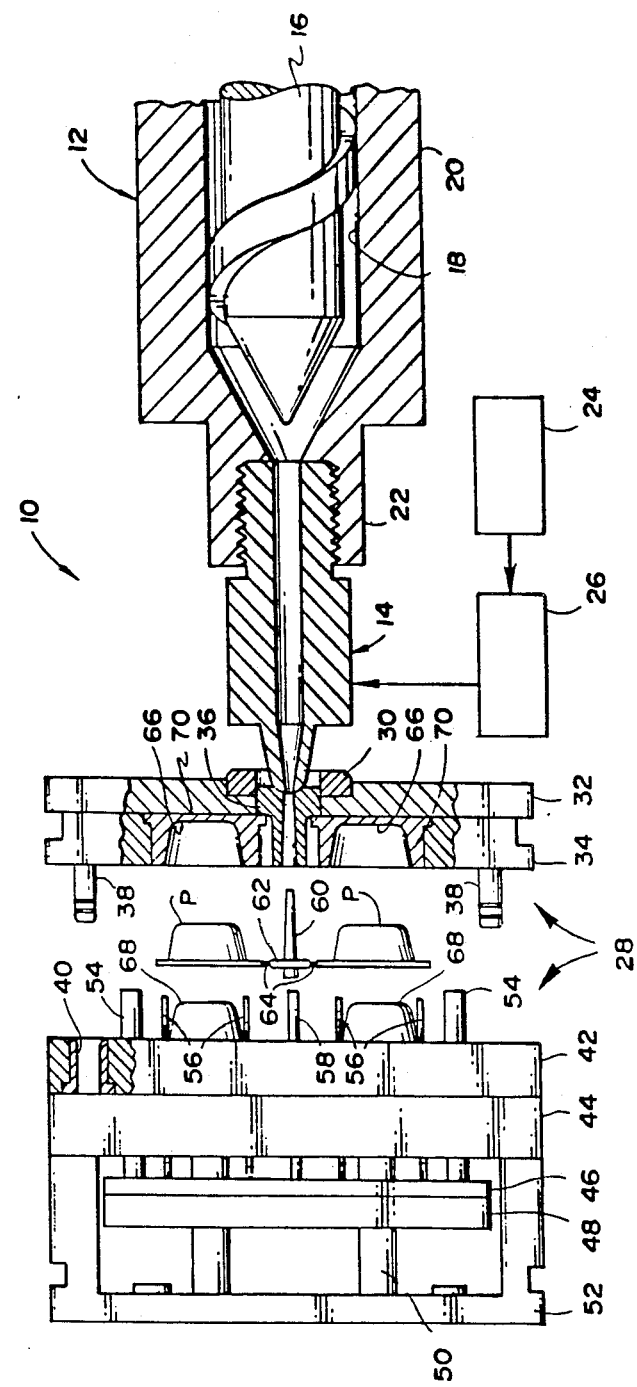
FIG. 1 is a schematic view, partially broken away and in cross-section, of a conventional fluid-assisted injection molding system including a mold in its open position, a source of fluid and its associated control valve and an injection molding machine having a nozzle.

Referring now to FIG. 1 there is illustrated a conventional gas-assisted injection molding system, generally indicated at 10, for making a plastic body from plastic resin. A general understanding of the different components of the system 10 is useful in understanding the method and system of the present invention.

Briefly, the injection molding system 10 includes an injection molding machine, generally indicated at 12, having a nozzle, generally indicated at 14, for injecting predetermined amounts or shots of molten resin. The injection molding machine 12 includes a hydraulic screw ram 16 which is disposed in a bore 18 formed in a barrel 20 of the injection molding machine 12. The ram 16 plasticizes and advances resin towards the nozzle 14. Upon complete plasticization of the resin, the screw ram 16 is hydraulically advanced towards the threaded portion 22 of the barrel 20 to inject molten plastic through the nozzle 14, as is well known in the art.

The system 10 also includes a pressurized fluid supply 24 which supplies pressurized fluid, (i.e. typically nitrogen gas), to the nozzle 14 through a fluid control valve 26. The valve 26 controls the flow of pressurized fluid from the fluid supply 24 in synchronization with the injection of molten plastic from the nozzle 14, as is also well known in the art.

The system 10 further includes a mold or a mold body, generally indicated at 28. As illustrated in FIG. 1, the mold 28 comprises a two-plate mold body. One of the plates includes a locating ring 30 for locating the injection end of the nozzle 14. The locating ring 30 is mounted on a clamp plate 32 which, in turn, is fixedly connected to a cavity retainer plate or cavity plate 34. A sprue bushing 36 is disposed within the locating ring 30 and is supported by the clamp plate 32.

Leader pins 38 on the cavity plate 34 provide the male half of the male/female connection of the first plate with the second plate of the two-plate mold 28. In particular, the second plate includes leader pin bushings 49 (only one of which is shown) which slidably receive and retain the leader pins 38 therein in the closed position of the mold 28. The leader pin bushings 40 are retained within a core retainer plate 42. The core retainer plate 42 is fixedly connected to a support plate 44 which, in turn, is connected to an ejector retainer plate 46. The ejector retainer plate 46 is connected to an ejector plate 48 which, in turn, is supported by support pillars 50. The support plate 44 is also fixedly connected to the ends of a U-shaped ejector housing 52 to which the support pillars 50 are also connected.

The plate 46 supports a plurality of return pins 54, ejector pins 56 and a sprue puller pin 58 which extend toward the plate 34 and through the plates 42 and 44. The ejector pins 56 are provided for ejecting parts P formed within the mold 28. The sprue puller pin 58 is aligned with the sprue bushing 36.

As illustrated in FIG. 1, the parts P are interconnected by a sprue 60, a runner 62 and gates 64 which define a resin flow path from the sprue bushing 36 to cavities 66. Opposing surfaces of male and female mold parts 68 and 70, respectively, define the cavities 66. The mold parts 68 are supported on the plate 46 and the mold parts 70 are supported on the cavity retainer plate 34.

Figure 2:
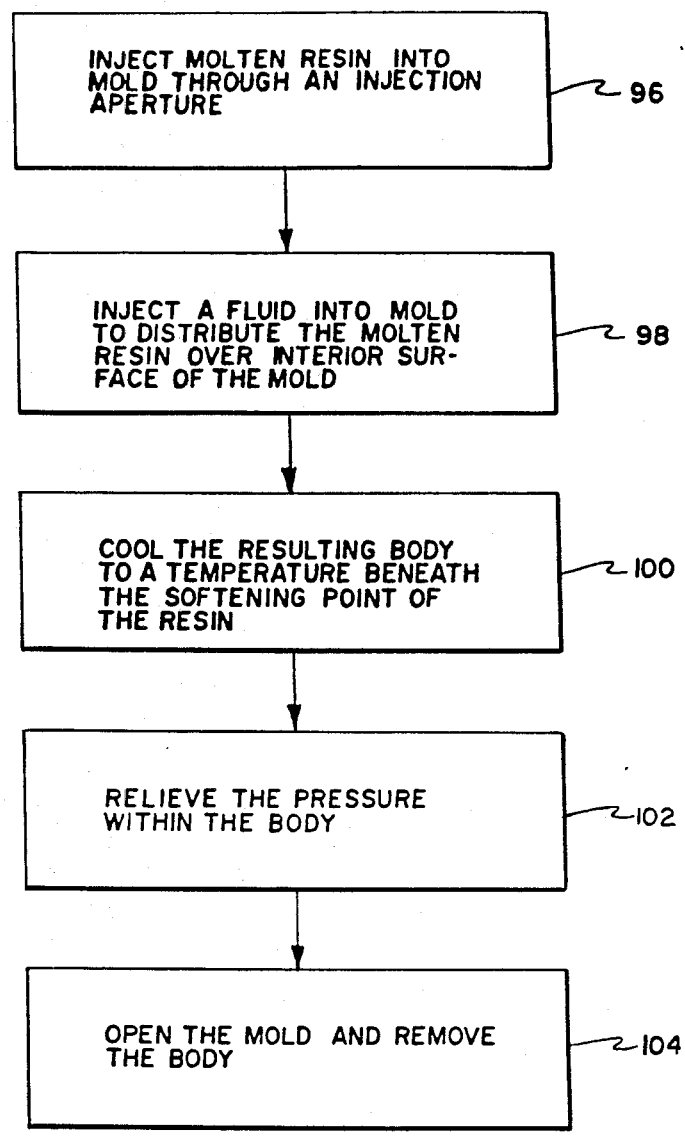
FIG. 2 is a block diagram illustrating the various steps of the method of the present invention.

Referring now to FIG. 2 in combination with FIG. 3, there is illustrated, in flowchart form, process steps of the method of the present invention.

In step 96, plastic resin is injected into the mold 28 through an injection aperture formed in the sprue bushing 36.

In step 98, gas is injected into the mold 28 through a fluid aperture 80 under control of the valve 26. However, it is to be understood that the gas may be injected anwwhere in the mold 28 and need not be injected through the injection aperture.

In step 100, the gas supports the plastic article or part in the mold cavity 66 against the interior surfaces thereof until the article cools.

In step 102, the gas is vented through an opening formed in the part as described in detail in the embodiment of FIGS. 3 through 7.

In step 104, the mold 28 is opened to remove the part from the mold 28.

Referring now to FIG. 3, there is illustrated a first embodiment of the present invention having a cutting means or mechanism including a cutting member, generally indicated at 72. The cutting member 72 is in the form of an apertured rotary actuator 72. The rotary actuator 72 may be placed in any relatively "cold area" of the mold 28, such as the sprue, runner or gate. A first mold part 74 of the mold 28 cooperates with the rotary actuator 72 to at least partially define a resin flow path from the sprue bushing 36 to the cavity 66. In particular, both the rotary actuator 72 and the mold part 74 have opposing grooved surfaces 76 and 78, respectively, to form pockets for receiving and retaining the molten resin during injection thereof. Gas is introduced into the resin flow path, for example, through the nozzle 14 into the fluid aperture 80 which is in communication with the interior of the hollow-shaped body.

Obviously, there are numerous choices of gas entry devices possible for controlled gas entry with respect to the part.

After the hollow-shaped body is cooled within the mold to a temperature beneath the softening point of the resin and the resin has solidified within the grooved surfaces 76 and 78, the rotary actuator 72 is actuated to rotate about an axis 82 in controlled fashion from a molding position, illustrated by solid lines in FIG. 3, to a venting or relieving position, illustrated by phantom lines 84. The lines 84 also define a scrap chute to remove the sheared sucker 97 within the groove 76. In this way, the cooled resin is cut by applying a cutting force tangential to the cold resin. The cutting force consequently is a sheer force. In the position indicated by the phantom line 84, a piece of resin may be removed in any one of a number of ways.

The rotary actuator 72 includes a fluid-relieving aperture 86 which, after rotation of the rotary actuator 72 to the phantom line position 84, is in fluid communication with the fluid aperture 80 to thereby relieve the pressure within the hollow-shaped body through a vent hole 88, also formed within the actuator 72. The vent hole 88 may be communicated with appropriate valving (not shown) to further control decompression within the hollow-shaped body.

Referring now to FIG. 4, there is illustrated a second embodiment of the method and system of the present invention. A single prime designation is utilized in FIG. 4 to the same numbers utilized in FIG. 3 to indicate a part which is either the same or performs a similar function to the corresponding part in FIG. 3. The cutting member takes the form of a slide 72, which moves in a linear fashion, rather than in a rotary fashion, as illustrated by the embodiment of FIG. 3. However, the operation is otherwise substantially identical.

In like fashion, referring now to FIG. 5, there is illustrated a third embodiment of the method and system of the present invention wherein a double prime designation is given to the same reference numeral which designates the same or similar part or which performs the same or similar function as the corresponding part of FIG. 3.

In FIG. 5, a part of the surface 76" is formed by a movable ejector pin, generally indicated at 90. The pin 90 has an inclined surface 92 which cooperates with an inclined surface 94 of a mold part 95 in which the mold part 72" is slidally received in order to eject the sheared sucker 97" of the cooled resin upon movement in the direction of the arrow 82".

Figure 6:
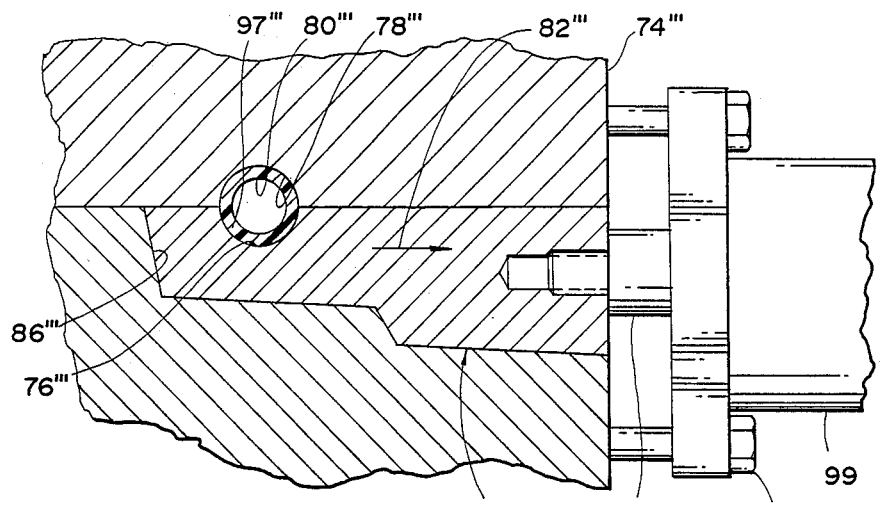
FIG. 6 is a view, partially broken away and in cross-section, iillustrating a fourth embodiment of the present invention.

Referring now to FIG. 6, there is illustrated a fourth embodiment of the method and system of the present invention wherein again the same or similar part to the corresponding part illustrated in FIGS. 3 through 5 has the same reference numeral, except it has a triple prime designation.

In the embodiment of FIG. 6, a cylinder 99 is secured to the mold by mounting bolts 101. The cylinder 99 has a shaft 103 which is threadedly secured to the mold part 72''' so that retraction of the shaft 103 causes the mold part 72''' to move in the direction of the arrow 82'''. In this way, again a hole is cut in the cooled resin in order to relieve the pressure within the hollow-shaped body.

Figure 7:
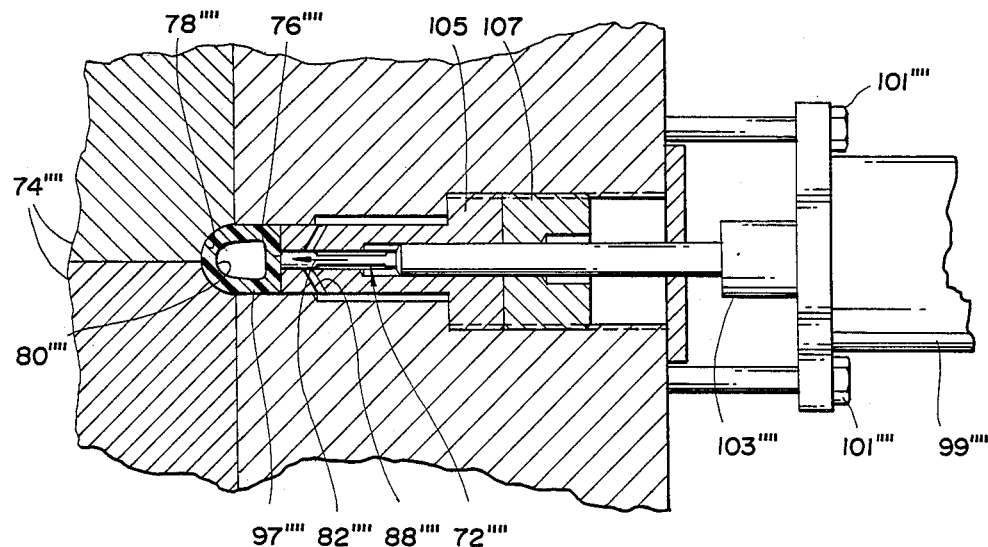
FIG. 7 is a view, partially broken away and in cross-section, illustrating a fifth embodiment of the present invention.
Figure 8:
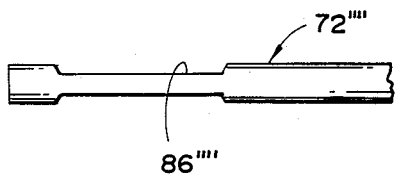
FIG. 8 is an enlarged view, partially broken away, of a punch pin of FIG. 7.

Referring now to FIG. 7, there is illustrated a fifth embodiment of the method and system of the present invention wherein the same or similar parts to any of the parts of FIGS. 3 through 6 are illustrated by a quadruple primed numeral.

The cutting member 72'''' is a punch pin which is linearly movable by the cylinder 99''''. The pin is slidably supported within the mold by a plug and guide bushing 105 which is threadedly secured in the mold. In turn, the bushing 105 is secured within the mold by a threaded screw plug 107.

The punch pin includes vent flats 86'''' to permit controlled venting of the body. The vent flats 86'''' are in communication with vent holes 88'''' formed in the bushing 105 in the extended position of the punch pin.

The advantages accruing to the method and system of the invention are numerous. For example, decompression is controlled to thereby eliminate moldings having stress cracks, warpage and unsightly surfaces.

While the best modes for carrying out the invention has herein been described in detail, those familiar with the art to which this invention relates will recognize various alternative designs and embodiments for practicing the present invention as defined by the following claims.

What is claimed is:

1. A method for making a hollow-shaped body from molten resin in an injection molding system including a mold having an injection aperture and an injection nozzle, the method comprising the steps of:

injecting an amount of molten resin sufficient for the preparation of said hollow-shaped body from said injection nozzle through said injection aperature and along a resin flow path which extends from an injection sprue bushing to a mold cavity;

injecting a fluid under pressure into said resin flow path to distribute the molten resin over the interior surfaces of said mold cavity and thereby forming a fluid aperture in said resin flow path and in communication with hollow spaces formed within the interior of said hollow-shaped body;

relieving the fluid pressure within the hollow-shaped body by moving a cutting member which partially defines said resin flow path relative to said resin flow path, thereby cutting a hole through said resin in said resin flow path such that said hole communicates with said fluid aperture and aligning a fluid pressure relieving conduit at least partially defined by said cutting member with said hole such that said fluid pressure relieving conduit communicates with said fluid aperture through said resin flow path and allowing said fluid within said hollow spaces to be exhausted through said fluid pressure relieving conduit; and opening the mold to remove the hollow-shaped body.

2. The method as claimed in claim 1 further comprising the step of controlling the flow of fluid during the step of relieving.

3. The method as claimed in claim 1 wherein the cutting member applies a cutting force tangential to the cooled resin whereby the cutting force is a sheer force.

4. The method as claimed in claim 1 wherein the cutting member applies a cutting force substantially perpendicular to the cooled resin.

* * * * *